F. M. SHEPARD.
CURRY-COMB.

No. 172,509.  Patented Jan. 18, 1876.

Witnesses:  Inventor:

UNITED STATES PATENT OFFICE.

FREDERICK M. SHEPARD, OF NEW YORK, N. Y.

IMPROVEMENT IN CURRY-COMBS.

Specification forming part of Letters Patent No. 172,509, dated January 18, 1876; application filed January 3, 1876.

*To all whom it may concern:*

Be it known that I, FREDERICK M. SHEPARD, of the city, county, and State of New York, have invented certain new and useful Improvements in Curry-Combs, Brushes, and like articles, of which the following is a specification:

My invention relates to rubber curry-combs, and also to rubber "bath-emollients," or scrubbers, and brushes of various kinds having flexible backs.

My invention consists in providing articles of the kind referred to with perforated backs, which have the advantage of allowing the article, whether brush or comb, to be more readily and thoroughly cleansed. Dandruff, also, is thereby allowed to escape, and, furthermore, much more flexibility and pliability are imparted to the back, which in articles of this kind is a great desideratum.

The accompanying drawing represents a curry-comb made in accordance with my invention.

Figure 1:
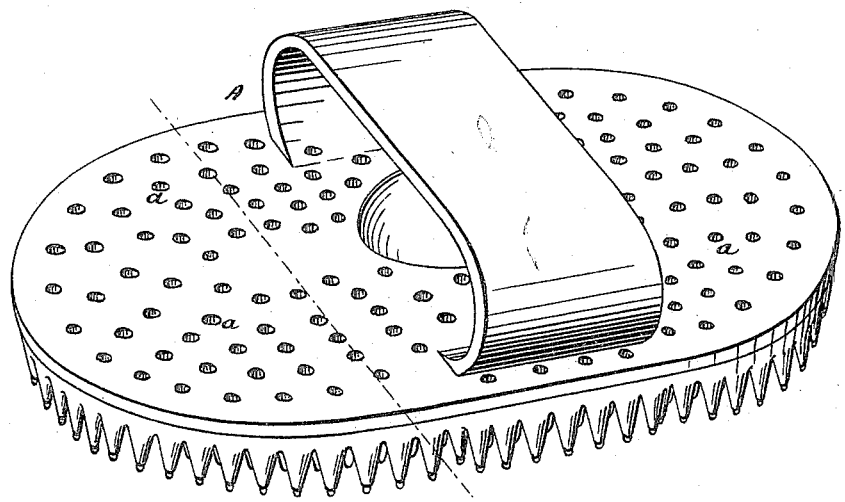
Figure 2:
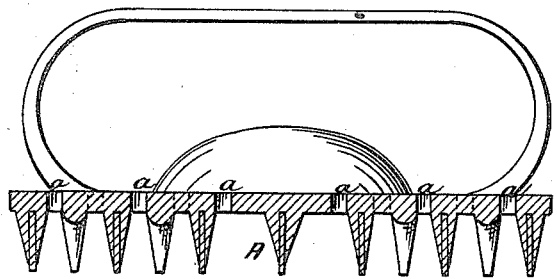

Figure 1 is a perspective view of a curry-comb. Fig. 2 is a transverse vertical section of the same, showing more clearly the perforations.

The flexible curry-comb A is made of vulcanized rubber, and is of the usual construction, save that the back is perforated, as indicated, the perforations *a* extending through the back and between the teeth. When the comb is thus made dandruff will blow out, and can be readily removed.

The comb can be more easily cleansed, and it possesses greater flexibility, than one having a solid back of the same thickness.

The same arrangement of perforations can be used in a rubber-back brush or other analogous articles, as above specified.

What I claim is—

The implement, as specified, formed with a perforated flexible back, substantially as shown and set forth.

In testimony whereof I have hereunto signed my name this 31st day of December, A. D. 1875.

FREDERICK M. SHEPARD.

Witnesses:
   CHAS. B. COE,
   W. F. CLAPP.